(12) United States Patent
Silverman

(10) Patent No.: US 8,665,863 B2
(45) Date of Patent: Mar. 4, 2014

(54) SYSTEMS AND METHODS FOR MONITORING QUALITY OF CUSTOMER SERVICE IN CUSTOMER/AGENT CALLS OVER A VOIP NETWORK

(75) Inventor: Jonathan M. Silverman, Minneapolis, MN (US)

(73) Assignee: Calabrio, Inc., Minneapolis, MN (US)

( * ) Notice: Subject to any disclaimer, the term of this patent is extended or adjusted under 35 U.S.C. 154(b) by 1502 days.

(21) Appl. No.: 12/041,149

(22) Filed: Mar. 3, 2008

(65) Prior Publication Data

US 2008/0219243 A1 Sep. 11, 2008

Related U.S. Application Data

(60) Provisional application No. 60/892,986, filed on Mar. 5, 2007.

(51) Int. Cl.
*H04L 12/66* (2006.01)

(52) U.S. Cl.
USPC ...... 370/352; 370/353; 370/354; 379/265.06; 379/265.07

(58) Field of Classification Search
None
See application file for complete search history.

(56) References Cited

U.S. PATENT DOCUMENTS

| | | | |
|---|---|---|---|
| 4,015,088 A * | 3/1977 | Dubnowski et al. | 704/208 |
| 6,363,145 B1 * | 3/2002 | Shaffer et al. | 379/265.02 |
| 6,574,216 B1 | 6/2003 | Farris et al. | |
| 6,970,554 B1 | 11/2005 | Peterson et al. | |
| 7,379,471 B2 * | 5/2008 | Mitsumori et al. | 370/426 |
| 7,836,169 B2 * | 11/2010 | Satyanarayanan et al. | 709/224 |
| 7,852,784 B2 * | 12/2010 | Leung et al. | 370/252 |
| 8,050,923 B2 * | 11/2011 | Blair | 704/251 |
| 2006/0062376 A1 * | 3/2006 | Pickford | 379/265.12 |
| 2006/0146784 A1 * | 7/2006 | Karpov et al. | 370/351 |

OTHER PUBLICATIONS

International Search Report and Written Opinion of international application No. PCT/US08/55619, mailed Jun. 5, 2008, 11 pp.

* cited by examiner

*Primary Examiner* — Marcus R Smith
*Assistant Examiner* — Mark A Mais
(74) *Attorney, Agent, or Firm* — Faegre Baker Daniels LLP

(57) ABSTRACT

A system and method for monitoring call quality for calling centers using packet based call technology. A distributed system manages packet flow between a caller and a call center agent and storage servers. The distributed system is used to monitor, record and analyze real time communications between the caller and the agent and to identify whether certain predetermined parameters are occurring in any particular call. In the event that such a predetermined parameter does exist, a message can be sent to a supervisory station or dialog guidance messages may be sent to the agent.

22 Claims, 5 Drawing Sheets

SYSTEMS AND METHODS FOR MONITORING QUALITY OF CUSTOMER SERVICE IN CUSTOMER/AGENT CALLS OVER A VOIP NETWORK

PRIORITY CLAIM

This application claims the benefit of U.S. provisional Application No. 60/892,986, filed Mar. 5, 2007, entitled "SYSTEMS AND METHODS FOR MONITORING QUALITY OF CUSTOMER SERVICE IN CUSTOMER/AGENT CALLS OVER A VOIP NETWORK."

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2006 Calabrio, Inc.

BACKGROUND OF THE INVENTION

Many companies use quality monitoring applications to record calls between customers and employees of the company. The recorded calls can be used to evaluate customer interactions for quality of service. For example, an evaluation form may be associated with a contact type and used to assess the agent's performance. Recordings may be saved for later verification of the transactions. Recordings may be archived for regulatory compliance. Quality monitoring of calls, therefore, serves many purposes.

Typically, company agents are located at a contact/call center where they handle calls from customers. Conventionally, many of the quality monitoring systems are based on telephony systems that use a time division multiplexed (TDM) infrastructure. In a TDM telephony system, a set of circuits interconnect a private branch exchange (PBX) to the public switched telephone network (PSTN). These circuits are called trunks and the interconnection is described as network side. Each trunk may handle one or more voice calls. All of the trunks terminate in one physical location, the PBX.

In a TDM infrastructure, all agents in a company's contact center typically have a physical circuit that interconnects their phones to the PBX. These circuits are called lines and the interconnection is described as station side. There is one line per agent and all of the lines terminate in one physical location, the PBX.

A PBX provides a central switching point in which customer calls enter a contact center and are routed to agents. Typical TDM approaches to voice call recording place one or more server computer(s) in the same location as the PBX. A recording device of the server has a number of voice ports that are interconnected with the PBX. The server may be interconnected either on the line side or the trunk side. Interconnecting on the trunk side allows recording of the conversation from the customer's perspective (i.e., includes all devices that the customer's call is routed through). Interconnecting a server on the station side allows for recording of agent conversations thus supporting agent evaluation. Recording solutions described here with regard to TDM infrastructures are referred to as legacy recording solutions.

When attempting to adapt legacy call recording solutions to a VoIP infrastructure there is a natural tendency to look for similarities between VoIP infrastructures and TDM infrastructures. Specifically, if a central point can be identified through which all customer calls can be routed to agents, then a legacy-type recording solution may be adapted to VoIP. A data network may be designed so that there is a common egress point to a call center. This requires that all VoIP conversations be routed through a set of network routers that are interconnected to a central Ethernet switch. The switch becomes the egress point for customers' calls. A recording server may be attached to the Ethernet switch on a port that is configured to receive a copy of the VoIP packets. This is commonly referred to as a switched port analyzer network (SPAN) port.

The server attached to the SPAN port acts as a network sniffer. The IP packets are sniffed off of the SPAN port and analyzed to determine which packets correspond to the VoIP calls (e.g., voice packets using real time protocol, RTP) and will be stored in a file system. A voice capture subsystem (VCS) is a component of a VoIP recording solution that captures the voice packets.

Many of the challenges in designing a quality monitoring system for VoIP networks are driven by the flexibility of the VoIP network topology. For example, in a VoIP environment, there is no requirement for a single ingress/egress point to an enterprise's employees. The enterprise's resources and employees may be geographically dispersed over multiple locations. In addition, any location may be an ingress/egress point for a customer's VoIP telephone calls. For example, a customer call may be routed from the PSTN to a voice gateway in the customer's local calling area, queued there and then routed to an enterprise's employee that is in the same geographical location, a facility at a corporation's headquarters, a facility overseas such as an off-shore outsourcer or a home office.

The absence of a single ingress/egress point imposes a number of limitations on a SPAN port adaptation of a legacy recording solution. The implementation of the legacy recording solution may require that a non-optimal approach to the routing of packets be implemented. For example, all VoIP packets may need to be routed from the edge to a core switch and back to the edge so that the voice capture subsystem (VCS) can see the real-time transport protocol (RTP) packets. One consequence of non-optimal routing is a dramatic increase of the network bandwidth required to support the call volume. This requires a customer to acquire additional switches and routers. Moreover, the challenge in placing a VCS server at a central site is further compounded because the VCS server may not be able to keep up with the network traffic that must be analyzed to identify the RTP packets. A data switch may support a larger number of ports that the number of ports that may be associated with a span port and processed in real time by the VCS server. This results in a potentially large number of VCS servers being required. An alternative architecture is to not modify the network routing of voice and data and allow multiple egress points. In this architecture the number of VCS servers is significantly larger. The increase in the number of VCS servers increases the capital acquisition cost in addition to the ongoing operating expenses.

As such, there are a number of challenges and inefficiencies created in adapting a legacy recording architecture to a VoIP infrastructure. For example, legacy-type recording solutions are unable to efficiently associate agent side activities or processing with points or events in a customer/agent conversation. Thus, it can be difficult to obtain a full view of the transaction. It is with respect to these and other problems that embodiments of the present invention have been made.

SUMMARY OF THE INVENTION

According to one embodiment, the present invention includes a system for distributed quality monitoring of packet-based communications. An agent station includes an agent desktop computer and a telephone connected to the agent desktop. The agent station's IP telephone is interconnected to an enterprise's network. The agent station's desktop is interconnected to the enterprise's network via the IP telephone. A server is operably connected to the agent desktop. The server is configured to provide a directory of information. A computer telephony interface is connected to the agent station, and is configured to provide the computer telephony interface to the agent desktop. An exchange manager, an IP PBX, is operably connected to the computer telephony interface. The exchange manager is configured to control phone call flow to the agent desktop. A storage facility is operably connected to the exchange manager, the storage facility being configured to additional storage capability for the system. The agent station can further include a packet monitor for identifying packets and a storage device for storing the packets identified by the packet monitor and/or a recording scheduler containing a schedule of calls to be recorded by the storage device. The recording scheduler can contain a schedule based on one or more call characterizations stored in the agent station, a schedule based on call signaling information detected by an agent station and/or a schedule based on a call being present at the agent station and the call being in a state matching a set of criteria stored in the agent station for calls to be recorded. The agent station can also include an analysis scheduler for identifying packets requiring further analysis. The analysis scheduler can contain a schedule based one or more call characterizations stored in the agent station, a schedule based on call signaling information detected by an agent station and/or a schedule based on a call being present at the agent station and the call being in a state matching a set of criteria stored in the agent station for calls to be recorded.

In another embodiment, a method of distributed quality monitoring in a packet-based communications system for use by at least a first user and a second user that includes the steps of receiving a packet representative of a phone call from a caller, transmitting the packet to an agent station, monitoring a parameter of further packet exchanges between the agent station and the caller, said monitoring to determine whether the parameter in a packet has a first relationship to a predetermined threshold and transmitting a report to a supervisory station if the first relationship exists. The monitoring step may further include the step of determining whether the first user and the second user are speaking at the same time for at least a predetermined amount of time, determining whether the first user and the second user have maintained silence during a call for a predetermined amount of time, determining whether a user has used one or more words from a predetermined set of words, determining whether the first user has used one or more words from a first predetermined set of words and the second user has used one or more words from a second predetermined set of words, determining whether a call has been placed on hold and/or determining whether a customer has identified a reason for a call that matches a reason from a first list of reasons for calls.

In yet another embodiment, the invention can be a system for quality monitoring of packet-based communications related to customer and call agent transactions, that includes an agent server including an agent desktop, a server and a IP telephone connected to the agent desktop. The agent server is configured to store and retrieve information relevant to the transaction. A computer telephony interface is operably connected to the agent server, and configured to provide the computer telephony interface to the IP telephone. An exchange manager is operably connected to the computer telephony interface and configured to control phone call flow to the IP telephone. A storage facility is operably connected to the exchange manager. The storage facility is configured to additional storage capability for the system. The agent server may further include a voice analyzer wherein the voice analyzer can produce a first output and the agent server includes a comparator to compare the first output to a set of stored output-notification criteria, the agent server sending a notice in accordance with the output notification criteria if the first output matches an output-notification criteria.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DESCRIPTION

Figure 1:
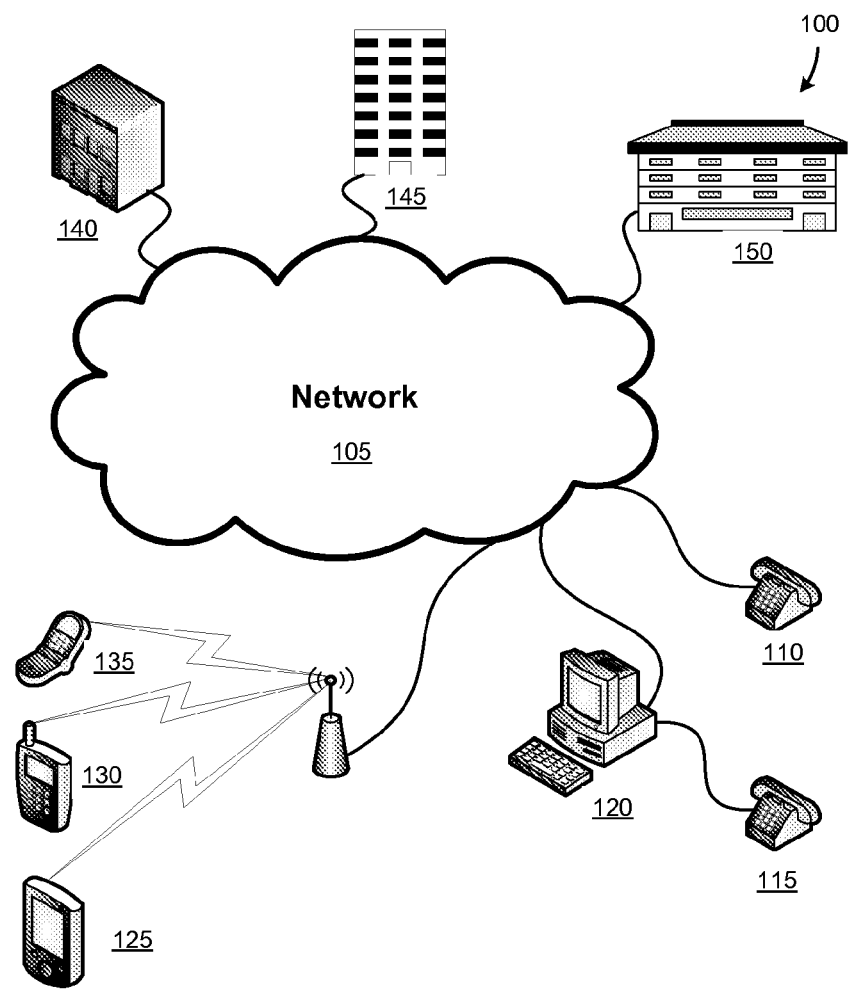
FIG. 1 illustrates an exemplary operating environment for a customer service call quality monitoring system in accordance with one or more embodiments of the present invention.

Various embodiments of the present invention generally relate to systems and methods for quality monitoring of transactions, or communication sessions, conducted over voice over Internet protocol (VoIP). More specifically, embodiments of the present invention relate to systems and methods for identifying the significant contacts, or workflows, for managing the quality monitoring of VoIP calls between customers of product and/or service providers and agents of the product and/or service providers.

Various embodiments of the present invention relate to an architectural approach to solve or mitigate many of the difficulties in adapting a quality monitoring solution in legacy, TDM, networks. Generally, various embodiments exploit distributed system technology and the VoIP infrastructure. Some embodiments move the intelligence, or computing power, for recording, scheduling contacts and analyzing contacts from a central site to one or more endpoints.

As a result of exploiting the VoIP infrastructure and various distributed system technologies, various embodiments of the present invention may result in quality monitoring service with several advantages over legacy quality monitoring systems. Examples of advantages of various embodiments may include, but are not limited to, one or more of the following: 1) the ability for a single system to scale to very large networks and support the recording of very large number of end user devices; 2) eliminate the need for a significant number of VCS servers; 3) conserve and manage the usage of WAN bandwidth; 4) enable post call filtering attributes such as longest, shortest, first or last call of day for a given call type; 5) distribute scheduler functions to the endpoints instead of a centralized, core subsystem; 6) single points of failure are limited to a scope of a single agent; 7) analyze a customer contact's speech in real time and facilitates immediate, corrective action; and 8) analyze a customer contact's speech without requiring a significant number of servers.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

While, for convenience, embodiments of the present invention are described with reference to monitoring quality of customer service in VoIP calls, other embodiments of the present invention may be equally applicable to other packet-based communication models. For example, the systems and methods described herein may be integrated with, or form part of, a system relating to monitoring multi-media communications between an agent and customer, or between two users of a dial tone service. Any latency dependent applications and/or applications that require real-time performance, such as instant messaging, applications based on human interactions (e.g., collaborative software, online/Web collaboration, voice conferencing, and video conferencing), and real-time data communication and/or exchange, such as market data applications, financial transactions, and the like may also be compatible with various embodiments of the present invention.

Terminology

Brief definitions of terms used throughout this application and attached appendix are given below.

The term "agent" generally refers to any person or automated application capable of handling calls from a customer as part of a contact center service. Handling calls can include gathering information, authenticating the caller, answering questions, providing information, servicing a request, updating account status, and others.

The phrase "communication network" or term "network" generally refers to a group of interconnected devices capable of exchanging information. A communication network may be as few as several personal computers on a Local Area Network (LAN) or as large as the Internet, a worldwide network of computers. The term "communication network" is intended to encompass any network capable of transmitting information from one entity to another. In one particular case, a communication network is a Voice over Internet Protocol (VoIP) network. In some cases, a communication network may be comprised of multiple networks, even multiple heterogeneous networks, such as one or more border networks, voice networks, broadband networks, service provider networks, backbone networks, Internet Service Provider (ISP) networks, and/or Public Switched Telephone Networks (PSTNs), interconnected via gateways operable to facilitate communications between and among the various networks.

The term "communicator" is used in its broadest sense to include endpoints and/or communication devices. Thus, a communicator can be an entity or individual associated with communications, and/or a communication device capable of receiving and/or sending such transmission that form a transaction. In some cases, transmissions can be real time transmissions including, but not limited to, video, audio, chat rooms, instant messaging, combinations of the aforementioned, and/or the like.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection on with another. Based on the disclosure provided herein, one of ordinary skill in the art will appreciate a variety of ways in which connection or coupling exists in accordance with the aforementioned definition.

The term "endpoint" can be a logical location on a communication network such that communications ongoing in relation to the logical location can be targeted, a physical location such that communications emerging from the geographic location are targeted, and/or an individual or entity such that communications associated with the individual or entity are targeted. Examples of endpoints include, but need not be limited to, VoIP phones with LAN connections, media terminated software phones and personal computers. In other cases, an endpoint may include mobile endpoints which are able to move from first geographic location to a second geographic location. Examples of mobile endpoints include, but need not be limited to, cellular telephones, VoIP phones, satellite phones, and the like.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

The phrases "memory store" or "data store" generally refer to any device, mechanism, or populated data structure used for storing information. For purposes of this patent application, "memory store" or "data store" are intended to encompass, but are not limited to, one or more databases, one or more tables, one or more files, volatile memory, nonvolatile memory and dynamic memory. By way of further illustration, for example, random access memory, memory storage devices, and other recording media are covered by the phrase "memory store" or "data store." Common examples of a memory store include, but are not limited to, magnetic media such as floppy disks, magnetic tapes, hard drives and/or the like. Other examples of "memory stores" include SIMMs, SDRAM, DIMMs, RDRAM, DDR RAM, SODIMMS, optical memory devices such as compact disks, DVDs, and/or the like. In addition, a "memory store" may include one or more disk drives, flash drives, databases, local cache memories, processor cache memories, relational databases, flat databases, and/or the like. This list is no way meant to be an exhaustive list of devices and/or data structures falling with in the definition of "memory store," but is instead meant to highlight some examples. Those skilled in the art will appreciate many additional devices and techniques for storing information which are intended to be included within the phrase "memory store."

The term "module" generally refers to a component comprising software, hardware, firmware, or any combination thereof. Modules are typically functional components that can generate useful data or other output using specified input(s). A module may or may not be self contained. An application program, also referred to as an application, may include one or more modules. In addition, a module may include one or more application programs.

The term "responsive" includes completely or partially responsive.

The term "transaction" or "communication session" generally refers to any interaction between one communicator and another communicator that has a definite beginning and a definite end, and which is composed of one or more transmissions. The transmissions within a "transaction" or "communication session" may be of the same type of multiple different types.

The term "Workflow" generally means a contact classifier, events, rules and actions. A contact classifier identifies the type of a contact. It is a top level categorization, specified once and used to group subsequent events, rules and actions. A typical contact classifier is the original number that the customer dialed. An Event is a manifestation of a real world interaction between the contact participants and the communications system (i.e., a PBX or voice communications channel and ACD, an email management system, etc.). There are a distinct set of events for each type of communication channel. Events typically have a well defined order in which they occur. The order is based on the communications channel. There is one instance of each Event for a workflow. A Rule is a set of data conditions that further categorizes a contact within the context of an event. Examples include the amount of time a caller is held or the recognition that a phrase was spoken. The data conditions within a Rule may be interrelated either by an "and" condition or an "inclusive or" condition. Multiple distinct sets of Rules can exist for any event. A set of actions are defined for each rule, to execute if the rule evaluates to true. An Action is one of the product defined Actions, for example an IPC send action or a keystroke macro.

The following text shows the hierarchical organization of a workflow. The events happen sequentially in time.

Contact Classifier: Called Number={800-555-1*}
  a. Event: Ringing
    i. Rule: Default
      1. ACTION: Begin Screen Recording
  b. Event: Answered
    i. Rule: Default
      1. ACTION: Begin Voice Recording
  c. Event: Talking
  Rule 1: Silence period of 20 seconds
  Action: Notify agent "Remember to keep speaking to the customer"
  Rule 2: Talk Over for minimum of 5 seconds AND agent "vulgar language"
    d. Action: Notify supervisor "Agent <name> talking over customer"
  Update supervisor report to "Low quality call"
  Notify agent "Show customer courtesy and let customer talk without interrupting"
  Rule 3: Hold of 60 seconds
  Action: Notify agent "Remember to minimize the length of holds and give customer updates at least once a minute"
  Rule 4: IVR data of "scheduled maintenance" AND customer "satisfied language"
  Action: Notify agent "Offer the customer a long term maintenance renewal contract"
  Rule 5: Transfer minimum of 2 times AND customer "vulgar language"
  Action: Notify supervisor "Agent <name> has difficult customer"
  Notify agent "Customer is frustrated due to number of times they've been transferred. Please listen to their frustrations and get supervisor's assistance as required."
  e. Event: Dropped
    i. Rule: Longest call for today OR $1^{st}$ call for today
      1. Action: End Screen Recording in 30 seconds
    ii. Rule: Default
      1. Action: End Screen Recording in 30 seconds If the specification states a component or feature "may", "can", "could", or "might" be included or have a characteristic, that particular component or feature is not required to be included or have the characteristic.

FIG. 1 illustrates an exemplary operating environment 100 for a distributed quality monitoring system in accordance with one or more embodiments of the present invention. The exemplary operating environment 100 includes a communication network 105, various communication devices, devices 110-135, and multiple enterprise, or business, locations 140-150 which may each contain one or more endpoints. The operating environment 100 enables two or more communicators to communicate over network 105.

Communication network 105 generally includes a group of interconnected devices capable of exchanging information. According to various embodiments, communication network 105 may be as few as several personal computers on a Local Area Network (LAN), or many thousands or millions of computers on a worldwide network, such as the Internet. In the embodiment of FIG. 1, communication network 105 is a Voice over Internet Protocol (VoIP) network. In accordance with various embodiments, communication network 105 may be comprised of multiple networks, even multiple heterogeneous networks, such as one or more border networks, voice networks, broadband networks, service provider networks, backbone networks, Internet Service Provider (ISP) networks, and/or Public Switched Telephone Networks (PSTNs), interconnected via gateways operable to facilitate communications between and among the various networks.

A customer may use one of several communication devices to communicate with a business. For example, a customer may use a telephone 110, VoIP telephone 115, a computer 120, a personal digital assistant (PDA) 125, a smart phone 130, a cellular telephone 135, and/or the like. The communications devices use a packet based network to connect with an endpoint within the business. As depicted in FIG. 1, a business may have multiple physical locations or office sites, as illustrated by buildings 140, 145, and 150. The physical locations may be in one general location or spread throughout the world.

One or more of the buildings may include a customer call center for the business. The call center may be staffed with employees to take orders, answer questions, provide information, and otherwise generally assist customers or clients of the business. The communication between an employee, or agent, and a customer may occur over a packet-based network, such as a VoIP network. The customer may be interconnected to either the PSTN or an IP network; the agent's communication device is interconnected to an IP network. Various embodiments allow the endpoint associated with the employee, or agent, where the call terminates to perform call recording for quality monitoring. As a result, network bandwidth and server storage requirements may be minimized. In addition, various embodiments provide software local to the endpoint which extends the types of processing that may be done in real-time at the agent-side endpoint.

Figure 2:
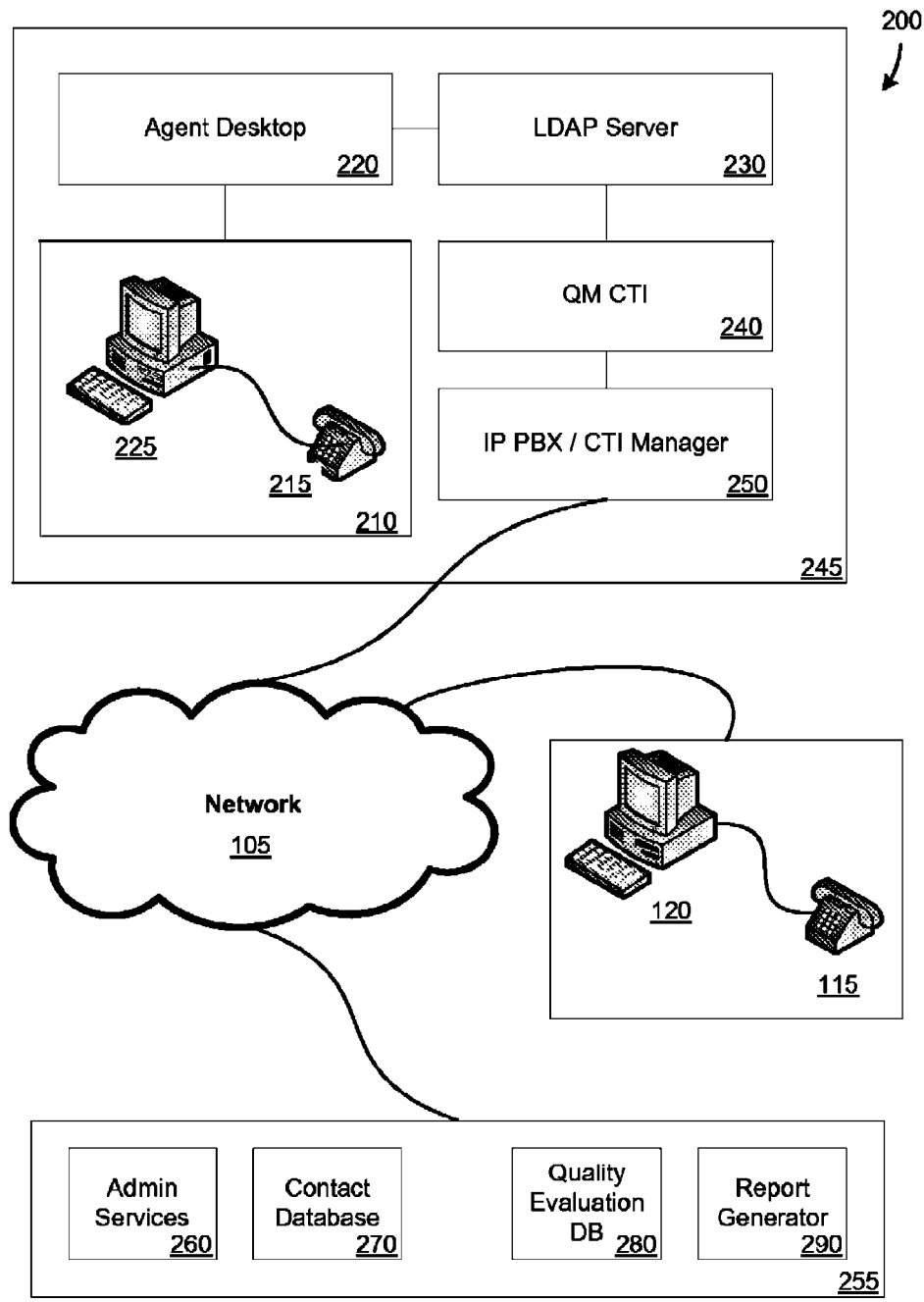
FIG. 2 illustrates an exemplary architecture of a customer service call quality monitoring system in accordance with one or more embodiments of the present invention.
Figure 3:
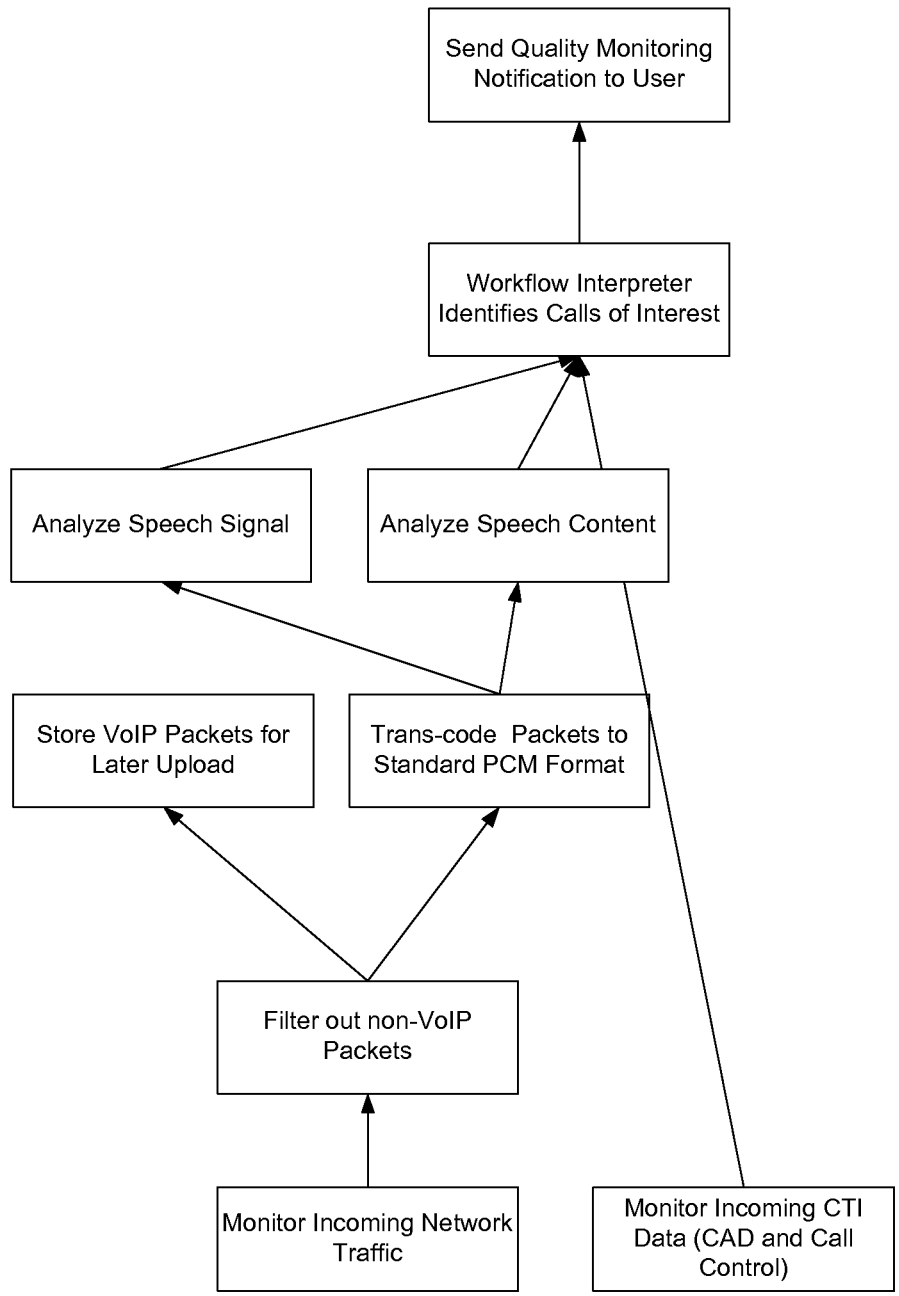
FIG. 3 is a flowchart illustrating an exemplary algorithm for use in customer service call quality monitoring systems which may be used in accordance with various embodiments of the present invention.

FIG. 2 illustrates an exemplary architecture of a distributed quality monitoring system 200 in accordance with one or more embodiments of the present invention. Generally, system 200 includes one or more employee agents at a call center, such as call center 245. Each agent uses an agent station 210 that includes at least a computer and a VoIP phone.

The VoIP phone can be a soft phone executing on the PC or a hard VoIP phone. Computer 205 can include various functionality such as, but not limited to, enterprise business applications, instant messaging, browsing, chat, messaging boards, or email. Agent station 210 may also include video conferencing equipment. The equipment associated with agent station 210 may be used to carry out communication sessions with customers, or clients, through network 105. In addition, the system may include one or more storage facilities 255 which may be used to store recorded conversations, conferences, email messages, and the like.

According to various embodiments, associated with an agent are an Agent Desktop 220, an Configuration Server 230, a customer quality monitoring computer telephony interface (QM CTI) 240, and a VoIP PBX (Voice over IP Private Branch Exchange) 250, which facilitate monitoring of customer service during communication session between an agent and customer. These components may be implemented in one or more server computers in communication with the agent station 210.

According to various embodiments, Agent Desktop 220 is a module comprising software, hardware, or any combination thereof which is responsible for recording client/agent communication sessions, collecting metadata associated with the call and uploading the data to the storage facilities 255. In some embodiments, Agent Desktop 220 may have the ability to compress voice files and aggregate metadata associated with the communication between the agent and the caller. In one or more embodiments, Agent Desktop 220 is capable of requesting that upload traffic be scheduled based on one or more factors including, but not limited to, business hours, processor utilization, call volume, local storage resources, and/or the like. In at least one embodiment, the Quality Monitoring system is able to take into account the number of devices co-located and set the traffic capacity by site/router link to the wide area network (WAN).

Still yet, in accordance with various embodiments, the Agent Desktop 220 may be configured for the real-time speech analysis of the recordings. Real time speech analysis includes the analysis of speech energy and the analysis of recognized strings of phonemes. Using the result of this analysis, various embodiments allow for automatic responsive action to be taken. This action may, for example, include automatic alerting of the agent's supervisor or other company-side personnel, displaying of scripted messages to an agent, automatic intervention, automatic call transfer, or others. For example, speech analysis may indicate that a customer has raised his/her voice, has used profanity, or has requested a supervisor or manager. Alternatively speech analysis may indicate that the agent and customer are talking simultaneously or not talking at all. In this exemplary scenario, an alert may be automatically generated to a supervisor. These supervisor alerts may take the form of e-mails, instant messages, and the like that may appear on a supervisor's PC or mobile device.

According to various embodiments, the architecture described in FIG. 2 provides a system which moves the voice capture and its real time analysis to the agent-side endpoints within the system. For example, when a customer makes a VoIP call using phone 115, it is routed through network 105 to the IP PBX which routes the call to the agent phone 215. The quality management (QM) CTI server 240 is notified of the call by the IP PBX 250. The QM CTI server signals the Agent Desktop 220 of the presence of the call.

IP PBX 250 allows interactions on telephone 215 and computer 225 to be integrated or coordinated. For example, IP PBX 250 may provide one or more of the following features: third party call control and monitoring of call ringing, answered, transfer, held, conference and other events as well as delivery of call related context such as calling party, original calling party, called party, original called party and alerting party. In some embodiments, IP PBX 250 manages all customer contact channels, such as voice, fax, email, fax, web, and/or the like. In addition, IP PBX 250 may be capable of managing the event flow that is generated by the telephony switch during a call. The following are examples of common events which may occur during a call: set up; deliver (ringing); establish (answer); clear (hang up); and end. In some embodiments of the present invention, other call events may be handled by IP PBX 250. Examples of other events include, but are not limited to, hold, retrieve from hold, conference, transfer, and/or forward.

In various embodiments, QM CTI server 240 provides the CTI feed to Agent Desktop 220. For example, according to some embodiments, QM CTI server 240 sends events to Agent Desktop 220 when the state of the phone associated with the agent changes.

Configuration server 230 generally provides a directory of information about the person, organization, configuration and workflow of the communication system. In some embodiments, Configuration server 230 may reflect various political, geographic, and/or organizational boundaries, depending on the model chosen. Configuration server 230, in some embodiments, may use Domain Name System (DNS) names for structuring the topmost levels of the directory hierarchy. Entries representing people, organizational units, printers, documents, groups of people or anything else may be present further into the directory.

According to various embodiments, storage facility 255 may include one or more of an administration services module 260, a contact database 270, a quality evaluation database 280, and a report generator module 290. In some embodiments, recording and/or quality management reports may be transferred from the local computers on a predetermined schedule or as the local storage resource utilization passes a threshold.

Administration service module 260 allows for the administration of the system configuration. This module, according to one or more embodiments, may be implemented in software, hardware, or a combination thereof. According to some embodiments, administration service module 260 provides various administration services which include, but are not limited to, definition of evaluation forms and associated workflows, administration of server software, rule management for load balancers, line of business applications, and associated network connectivity throughout their lifecycle, including initial deployment, delivery of software updates, and system auditing.

Contact database 270, according to various embodiments, may store contact recording on one or more media stores such as one or more relational databases and file systems. By way of further illustration, for example, random access memory, memory storage devices, and other recording media may be used by contact database 270 in accordance with various embodiments. Still yet, other embodiments include, but are not limited to, the use of magnetic media such as hard drives, RAID arrays, SANS and optical memory devices such as compact disks, DVDs, and/or the like. In addition, some embodiment may utilize one or more disk drives, flash drives, databases, local cache memories, processor cache memories, relational databases, flat databases, and/or the like. This list is no way meant to be an exhaustive list of devices and/or data structures which may be used by various embodiments, but is instead meant to highlight some examples. Those skilled in the art will appreciate many additional devices and techniques for storing information.

Quality evaluation database 280, may use one or more of the physical components or structures described for use in contact database 270. However, instead of storing contact recordings, quality evaluation database 270 stores quality monitoring evaluations reported by the local endpoint. However, in some embodiments, contact recordings and quality monitoring evaluations may be stored in a common database.

Some embodiments of storage facility 255 may include report generator 290. Report generator 290 may be configured to provide or generate more detailed reports about the quality monitoring of one or more employees or endpoints within the company.

The following is an exemplary algorithm for use in distributed quality monitoring systems which may be used in accordance with various embodiments of the present invention.

When a voice call is received by the IP PBX it is routed to the Agent's Phone. The QM CTI Manager monitors the IP PBX/CTI Manager for signaling information about calls to the contact center agents. When a call state occurs for a contact center agent the signaling information is transmitted to the agent desktop.

Agent Desktop uses the signaling information that it has received to determine if it should monitor the network traffic being received by the IP Phone. If a VoIP call for the agent is present, the RTP packets are filtered from the rest of the network traffic. The workflow rules retrieved from the Configuration server are used to determine what action to take for the VoIP call. A VoIP call which is to be recorded has its RTP traffic streamed to the hard drive of the agent PC. In parallel the RTP traffic is trans-coded to allow the real time analysis of the speech. The real time analysis is divided between speech energy and speech recognition. The customer's speech stream and the agent speech stream are kept separate. Each stream has timing marks to allow the two streams to be compared.

The speech energy analyzes the signal characteristics to detect voice energy. Voice energy analysis is done to determine if there are prolonged periods of silence or simultaneous talking. Each of the conversation's participants signals are also analyzed for significant changes in amplitude and pitch. The workflow rules are used to determine what action is to be taken based on the speech energy. The speech is analyzed to detect the presence of strings of phonemes that match words in different word categories. Word categories include sets of words and phrases that correspond to a concept. Examples of concepts include foul language, call escalation and competitor's names. Each of the conversation's participants speech is analyzed for the presence of selected word categories. The workflow rules are used to determine what action is to be taken based on the speech recognition.

Figure 4:
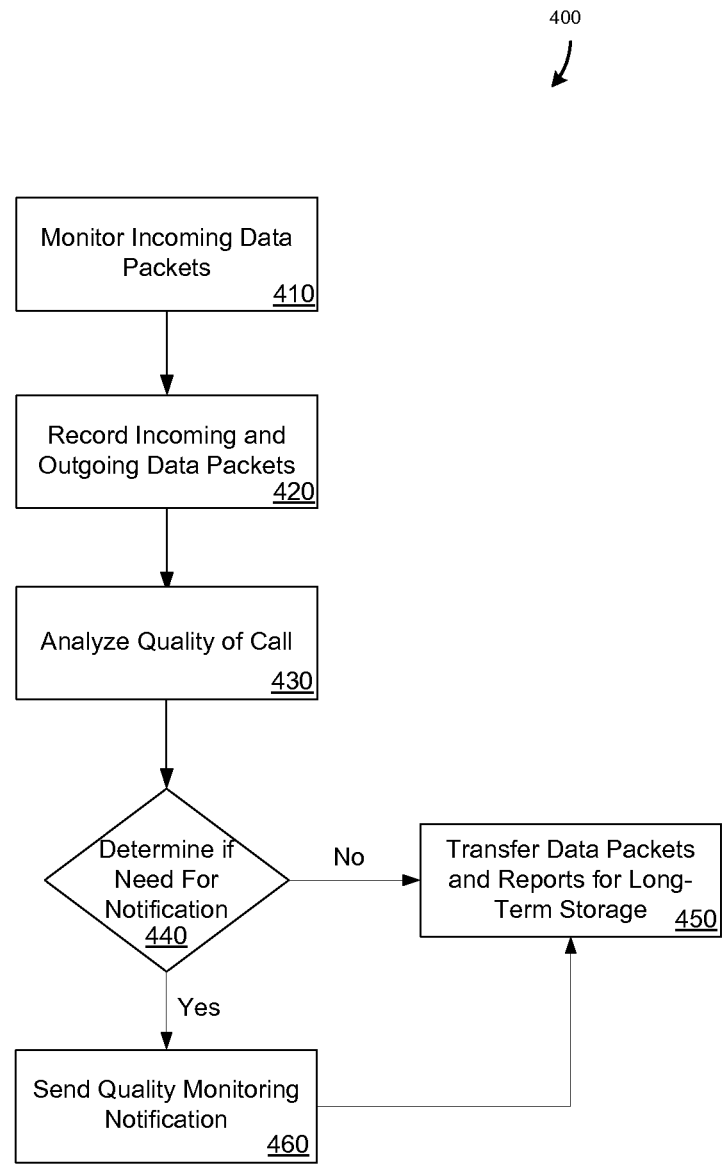
FIG. 4 is a flowchart illustrating an exemplary algorithm for use by an agent-side endpoint in one or more embodiments of the present invention.

FIG. 4 is a flowchart illustrating an exemplary algorithm for use by an endpoint in one or more embodiments of the present invention. According to one embodiment, the exemplary operation shown in FIG. 4 may be used by an Agent Desktop or a computer associated with an employee of the business. The exemplary operations, according to various embodiments, may be implemented in software, hardware, or a combination thereof.

A monitoring operation 410 monitors for incoming data packets which have been routed to the employee's local system. Once incoming or outgoing data packets are detected, a recording operation 420 may start recording the incoming and outgoing data packets. The data packets may comprise data for VoIP conversations, faxes, instant messaging, video conferencing, and/or the like. According to some embodiments, recording operation 420 records all data, even the view of the employee's computer.

In various embodiments, recording operation 420 records various input/output and user interface operations of one or more applications. In some cases, the recordings may be indexed by a time marker so that a reconstruction of what the agent was seeing, hearing, and doing may be reconstructed for training and/or evaluation purposes. For example, when a customer calls into the call center the agent may need to access information from the computer system. Recording operation 420 records what is being displayed on the monitor and the voices and other transmissions between the agent and customer. In some embodiments, the system administrators are able to set recording preferences which determine what information is being recorded.

This data may be indexed and recorded locally in real-time. According to some embodiments, this recording are stored locally on the employee's computer. In other embodiments, the recording are stored on a computer or server associated with only a few of the employees. Some embodiments provide for compression of the voice and/or media data in order to save storage resources.

As the data is being recorded, an analyzing operation 430 may also be performed to determine the quality of the call. For example, analyzing operation 430 may include one or more of speech analysis for the stress level of the callers, searching for key words or phrases (e.g. profanity, requests to speak with a supervisor, and requests to close the account), and the like. In some embodiments, the analyzing operation 430 is done in software, hardware, or a combination thereof.

As results are returned from the analyzing operation 430, a determining operation 440 may be used to determine if there is a need for call escalation, such as supervisor notification. The determination in operation 440 may comprise key word triggers and/or stress level indicators (e.g., tone and volume) which are exceeded. If a determination is made that no notification is required, then a transfer operation 450 may occur as scheduled.

If a determination is made that notification is required, then sending operation 460 sends a quality monitoring notification to the appropriate person within the organization. According to some embodiments, the notification may be sent in real-time via email, text message, pop-up window, automated phone message, and the like. In other embodiments, the notification may be stored, collected, and sent with other notifications at a predetermined time interval. For example, at the close of the business day.

According to various embodiments, transfer operation 450 transfers the recorded communications to the storage facilities. The transfer operation 450 may occur on a periodic basis, after a trigger from a user or system administrator, at the end a call, at the end of the day or week, as part of a batch process, or as the local computers reach a threshold in available disk space.

Embodiments of the present invention described above include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Exemplary Computer System

Figure 5:
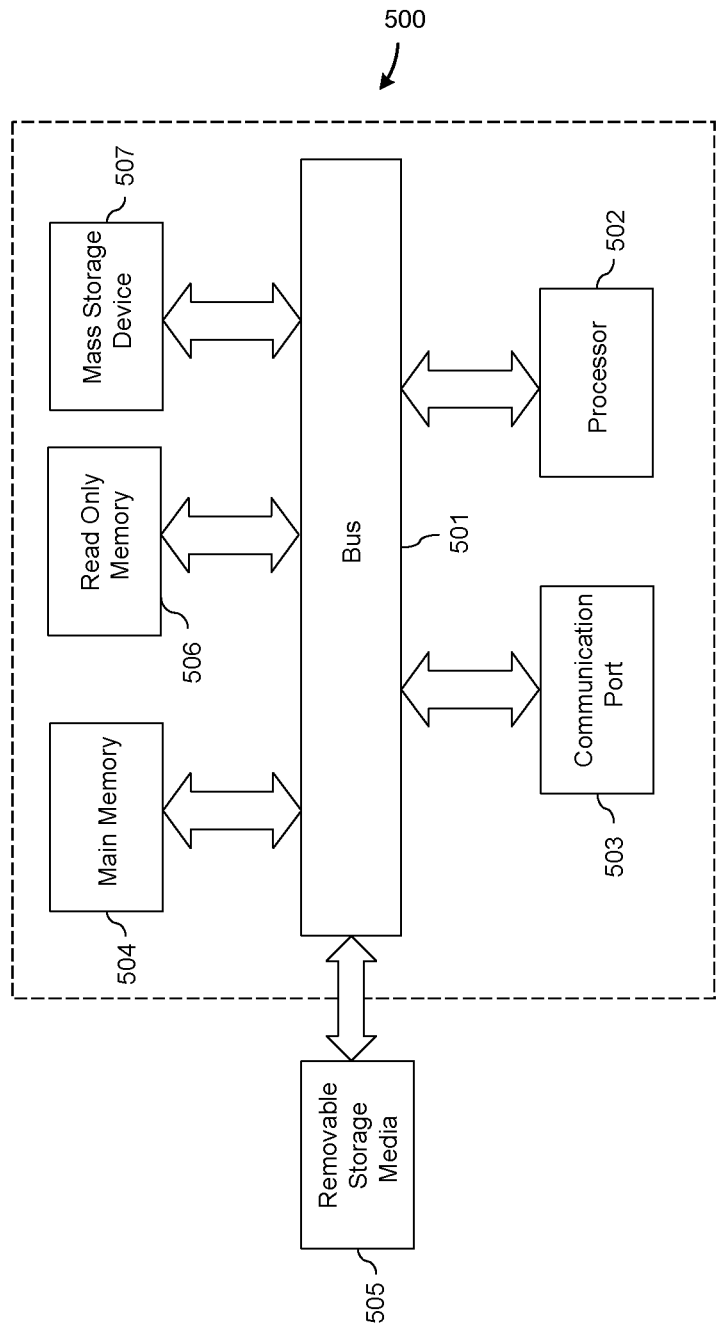
FIG. 5 illustrates an example of a computer system with which embodiments of the present invention may be utilized.

FIG. 5 illustrates an example of a computer system 500 with which embodiments of the present invention may be utilized. An exemplary computer system 500, representing an exemplary endpoint, server or client system, with which various features of the present invention may be utilized, will now be described with reference to FIG. 5. In this simplified example, the computer system 500 comprises a bus 501 or other communication means for communicating data and control information, and one or more processors 502, such as Intel® Itanium® or Itanium 2 processors, coupled with bus 501.

Computer system 500 further comprises a random access memory (RAM) or other dynamic storage device (referred to as main memory 504), coupled to bus 501 for storing information and instructions to be executed by processor(s) 502. Main memory 504 also may be used for storing temporary variables or other intermediate information during execution of instructions by processor(s) 502.

Computer system 500 also comprises a read only memory (ROM) 506 and/or other static storage device coupled to bus 501 for storing static information and instructions for processor(s) 502.

A mass storage device 507, such as a magnetic disk or optical disc and its corresponding drive, may also be coupled to bus 501 for storing information and instructions.

One or more communication ports 503 may also be coupled to bus 501 for supporting network connections and communication of information to/from the computer system 500 by way of a Local Area Network (LAN), Wide Area Network (WAN), the Internet, or the public switched telephone network (PSTN), for example. The communication ports 503 may include various combinations of well-known interfaces, such as one or more modems to provide dial up capability, one or more 10/100 Ethernet ports, one or more Gigabit Ethernet ports (fiber and/or copper), or other well-known network interfaces commonly used in current or future internetwork environments. In any event, in this manner, the computer system 500 may be coupled to a number of other network devices, clients, and/or servers via a conventional network infrastructure, such as an enterprise's Intranet and/or the Internet, for example.

Optionally, operator and administrative interfaces (not shown), such as a display, keyboard, and a cursor control device, may also be coupled to bus 501 to support direct operator interaction with computer system 500. Other operator and administrative interfaces can be provided through network connections connected through communication ports 503.

Finally, removable storage media 505, such as one or more external or removable hard drives, tapes, floppy disks, magneto-optical discs, compact disk-read-only memories (CD-ROMs), compact disk writable memories (CD-R, CD-RW), digital versatile discs or digital video discs (DVDs) (e.g., DVD-ROMs and DVD+RW), Zip disks, or USB memory devices, e.g., thumb drives or flash cards, may be coupled to bus 501 via corresponding drives, ports or slots.

In conclusion, the embodiments of the present invention provides novel systems, methods and arrangements for distributed quality monitoring of VoIP networks. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system for distributed quality monitoring of packet-based communications, comprising:
    an agent station including an agent desktop and a telephone connected to the agent desktop, the agent station including a voice analyzer;
    a server operably connected to the agent desktop, the server being configured to provide a directory of information;
    a computer telephony interface operably connected to the agent station, and configured to provide the computer telephony interface to the agent desktop;
    an exchange manager operably connected to the computer telephony interface and configured to control phone call flow to the agent desktop; and
    a storage facility operably connected to the exchange manager, the storage facility being configured to provide additional storage capability for the system,
    wherein the voice analyzer is configured to analyze voice packets in the communications based on speech energy and speech recognition, and
    wherein the agent station is configured to transmit a report to a supervisory station or notify an agent on how to manage the customer interaction if the speech energy exceeds a speech energy threshold and words in predetermined word categories are detected.

2. The system of claim 1, wherein the agent station further comprises:
    a packet monitor for identifying packets and a storage device for storing the packets identified by the packet monitor.

3. The system of claim 1, wherein the agent station further comprises:
    a recording scheduler containing a schedule of calls to be recorded by the storage device.

4. The system of claim 3, wherein the recording scheduler contains a schedule based on one or more call characterizations stored in the agent station.

5. The system of claim 3, wherein the recording scheduler contains a schedule based on call signaling information detected by an agent station.

6. The system of claim 3, wherein the recording scheduler contains a schedule based on a call being present at the agent station and the call being in a state matching a set of criteria stored in the agent station for calls to be recorded.

7. The system of claim 1, wherein the agent station further comprises:
    an analysis scheduler for identifying packets requiring further analysis.

8. The system of claim 7, wherein the analysis scheduler contains a schedule based one or more call characterizations stored in the agent station.

9. The system of claim 7, wherein the analysis scheduler contains a schedule based on call signaling information detected by an agent station.

10. The system of claim 7, wherein the analysis scheduler contains a schedule based on a call being present at the agent station and the call being in a state matching a set of criteria stored in the agent station for calls to be recorded.

11. The system of claim 1, wherein the agent station is configured for receiving one or more voice packets representative of a phone call and performing a speech analysis on the voice packets.

12. In a packet-based communications system for use by at least a first user and a second user, a method of distributed quality monitoring, comprising the steps of:
    receiving a voice packet representative of a phone call from a caller;
    transmitting the voice packet to an agent station;
    analyzing speech in the voice packet at the agent station, comprising:
        analyzing an energy of the speech to identify changes in amplitude and pitch in the speech; and
        searching for a presence of words in predetermined word categories;
    determining whether the speech energy exceeds a speech energy threshold or words in the predetermined word categories are detected; and
    transmitting a report to a supervisory station or notifying an agent on how to manage the customer interaction if the speech energy exceeds the speech energy threshold and words in the predetermined word categories are detected.

13. The method of claim 12, wherein the step of analyzing speech in the voice packet further comprises the step of determining whether the first user and the second user are speaking at the same time for at least a predetermined amount of time.

14. The method of claim 12, wherein the step of analyzing speech in the voice packet further comprises the step of determining whether the first user and the second user have maintained silence during a call for a predetermined amount of time.

15. The method of claim 12, wherein the step of searching for a presence of words in predetermined word categories comprises the step of determining whether a user has used one or more words from a predetermined set of words.

16. The method of claim 15, wherein the step of searching for a presence of words in predetermined word categories further comprises the step of determining whether the first user has used one or more words from a first predetermined set of words and the second user has used one or more words from a second predetermined set of words.

17. The method of claim 12, and further comprising the step of determining whether a call has been placed on hold.

18. The method of claim 12, wherein the step of analyzing speech in the voice packet further comprises the step of determining whether a customer has identified a reason for a call that matches a reason from a first list of reasons for calls.

19. The system of claim 12, wherein detecting the presence of words in predetermined word categories comprises identifying a plurality of phonemes within the voice packet.

20. A system for quality monitoring of packet-based communications related to customer and call agent transactions, comprising:
    an agent server including an agent desktop, a server, a voice analyzer, and a IP telephone connected to the agent desktop, the server being configured to the receive one or more voice packets representative of a phone call in the communications and store and retrieve information relevant to the transaction;
    a computer telephony interface operably connected to the agent server, and configured to provide the computer telephony interface to the IP telephone;
    an exchange manager operably connected to the computer telephony interface and configured to control phone call flow to the IP telephone; and
    a storage facility operably connected to the exchange manager, the storage facility being configured to provide additional storage capability for the system,
    wherein the voice analyzer is configured to analyze an energy of speech in the voice packets to identify changes in amplitude and pitch in the speech and search for words in predetermined word categories, and
    wherein the agent server is configured to transmit a report to a supervisory station or notify an agent on how to manage the customer interaction if the speech energy exceeds a speech energy threshold and words in the predetermined word categories are detected.

21. A system according to claim 20, wherein the voice analyzer produces a first output and the agent server includes a comparator to compare the first output to a set of stored output-notification criteria, the agent server sending a notice in accordance with the output notification criteria if the first output matches an output-notification criteria.

22. The system of claim 20, wherein the voice analyzer is configured for performing a speech analysis on the voice packets to identify a plurality of phonemes.

* * * * *